(12) United States Patent
Diaz-Yabor

(10) Patent No.: US 11,029,076 B1
(45) Date of Patent: Jun. 8, 2021

(54) PASSIVE AIR CONDITIONER DRAIN LINE CHLORINATOR

(71) Applicant: Martin A Diaz-Yabor, Miami, FL (US)

(72) Inventor: Martin A Diaz-Yabor, Miami, FL (US)

( * ) Notice: Subject to any disclaimer, the term of this patent is extended or adjusted under 35 U.S.C. 154(b) by 0 days.

(21) Appl. No.: 17/191,209

(22) Filed: Mar. 3, 2021

(51) Int. Cl.
| | | |
|---|---|---|
| *B01F 1/00* | (2006.01) | |
| *C02F 1/50* | (2006.01) | |
| *C02F 1/68* | (2006.01) | |
| *F24F 13/22* | (2006.01) | |
| *F25D 21/14* | (2006.01) | |

(52) U.S. Cl.
CPC ............ *F25D 21/14* (2013.01); *B01F 1/0033* (2013.01); *C02F 1/50* (2013.01); *C02F 1/688* (2013.01); *B01F 2001/0061* (2013.01); *C02F 2201/004* (2013.01); *C02F 2201/006* (2013.01); *C02F 2303/04* (2013.01); *F24F 2013/228* (2013.01)

(58) Field of Classification Search
CPC .. B01F 1/0033; B01F 2001/0061; C02F 1/50; C02F 1/688; C02F 2201/004; C02F 2201/006; C02F 2303/04; F24F 2013/228; F25D 21/14
See application file for complete search history.

(56) References Cited

U.S. PATENT DOCUMENTS

| | | | | |
|---|---|---|---|---|
| 5,402,813 A | * | 4/1995 | Keen ...................... | C02F 1/688 137/15.16 |
| 2008/0216503 A1 | * | 9/2008 | Cantolino ............... | F25D 21/14 62/285 |
| 2019/0071331 A1 | * | 3/2019 | Italia ....................... | C02F 1/688 |

* cited by examiner

*Primary Examiner* — Lucas A Stelling
(74) *Attorney, Agent, or Firm* — Ruben Alcoba

(57) ABSTRACT

A passive air conditioner drain line chlorinator that is connected to the outlet of a pan of an air conditioner and the drain line of the air conditioner. The drain line chlorinator comprises of a sloped housing that has an inlet and an outlet. A sloped cartridge that has at least two compartments is placed within the sloped housing. The sloped cartridge defines staggered thru holes between each compartment. Algae or mold eliminating tablets are placed within the compartments. And, a cover covers a central aperture of the sloped housing. The inlet of the sloped housing attaches to a drain line that leaves the pan of an air conditioner and the outlet of the sloped housing attaches to the drain line of the air conditioner.

4 Claims, 5 Drawing Sheets

PASSIVE AIR CONDITIONER DRAIN LINE CHLORINATOR

TECHNICAL FIELD

The present invention pertains to a passive air conditioner drain line chlorinator.

BACKGROUND

The present invention is designed to prevent algae and mold from forming in the drain line of air conditioners.

The present state of the art uses either computerized devices or passive gravity reservoir devices to prevent the buildup of algae or mold in the drain lines of air conditioners. The present invention uses a passive gravity device that is placed between the outlet of a pan of an air conditioner and the drain line of the air conditioner to prevent algae or mold from building up in the drain line of the air conditioner. The passive device does not require a computer or a reservoir to prevent the buildup of algae or mold.

When a drain line does not use a chlorinator or a chemical composition to prevent algae or mold buildup, the drain line of an air conditioner eventually clogs up and water flows back to the pan of the air conditioner until the pan overflows within the building structure that holds the air conditioner. Overflow of the water can lead to building damage or to a malfunction of the air conditioner if the air conditioner does not have an automatic shutdown mechanism.

U.S. Pat. Nos. 6,701,740, 5,975,113, 5,402,813 and 10,370,181 disclose passive gravity reservoir devices that use a reservoir to hold a chlorinator or a chemical composition within the reservoir to prevent algae or mold build up in the drain lines. The referenced devices minimize the life of the chlorinator or the chemical composition that is deposited into the reservoir, for the chlorinator or the chemical composition are continuously reacting with the liquid within the reservoir. The present device does not use a reservoir, so the life of the chlorinator held within the present device is extended exponentially when compared to the reservoir devices.

U.S. Pat. No. 10,514,182, issued to Oviedo on Dec. 24, 2019, discloses an automatic self-cleaning evaporator drain pan system. The "182" patent is described as an automatic self-cleaning evaporator drain pan system, having a container housing with a chemical container and a smart control pump. The smart control pump has at least one microprocessor. An evaporator drain system has at least one sensor connected to the smart control pump; and further having an electrical system. The container housing has a container tubing, and a chemical conduit with first and second chemical delivery lines. The chemical conduit extends from the smart control pump to the evaporator drain system, transporting a chemical composition. In operation, the chemical composition is mixed with condensed water and drains from the drain outlet toward a drainage line, whereby the chemical composition prevents microorganism growth, algae, gunk, and/or other solid material from forming, on the drain pan and the drainage line. The present invention is inherently different from the "182" Patent, for it is a passive drain line device that requires no computerized device to function.

The present invention resolves the need of having a computerized device or a passive reservoir device that will prevent algae or mold from building in the drain line of an air conditioner.

SUMMARY

The present invention is directed to a passive air conditioner drain line chlorinator.

The passive air conditioner drain line chlorinator connects to the outlet of a pan of an air conditioner and the drain line of the air conditioner. The drain line chlorinator comprises of a sloped housing that has an inlet and an outlet. A sloped cartridge that has at least two compartments is placed within the sloped housing. The sloped cartridge defines staggered thru holes between each compartment. Algae or mold eliminating tablets are placed within the compartments. And, a cover that covers a central aperture of the sloped housing. The inlet of the sloped housing attaches to a drain line that leaves the pan of an air conditioner and the outlet of the sloped housing attaches to the drain line of the air conditioner.

An object of the present invention is to provide a device that will extend the life of a tablet that is used to prevent algae or mold from growing in an air conditioner drain line.

Another object of the present invention is to provide a device that will allow a user to easily change the tablets needed to keep a drain line of an air conditioner unclogged.

A further object of the present invention is to provide a device that does not require a computerized system to maintain the drain line of an air conditioner free of algae or mold.

DRAWINGS

These and other features, aspects, and advantages of the present invention will become better understood with regards to the following description, appended claims, and drawings where:

DESCRIPTION

Figure 1:
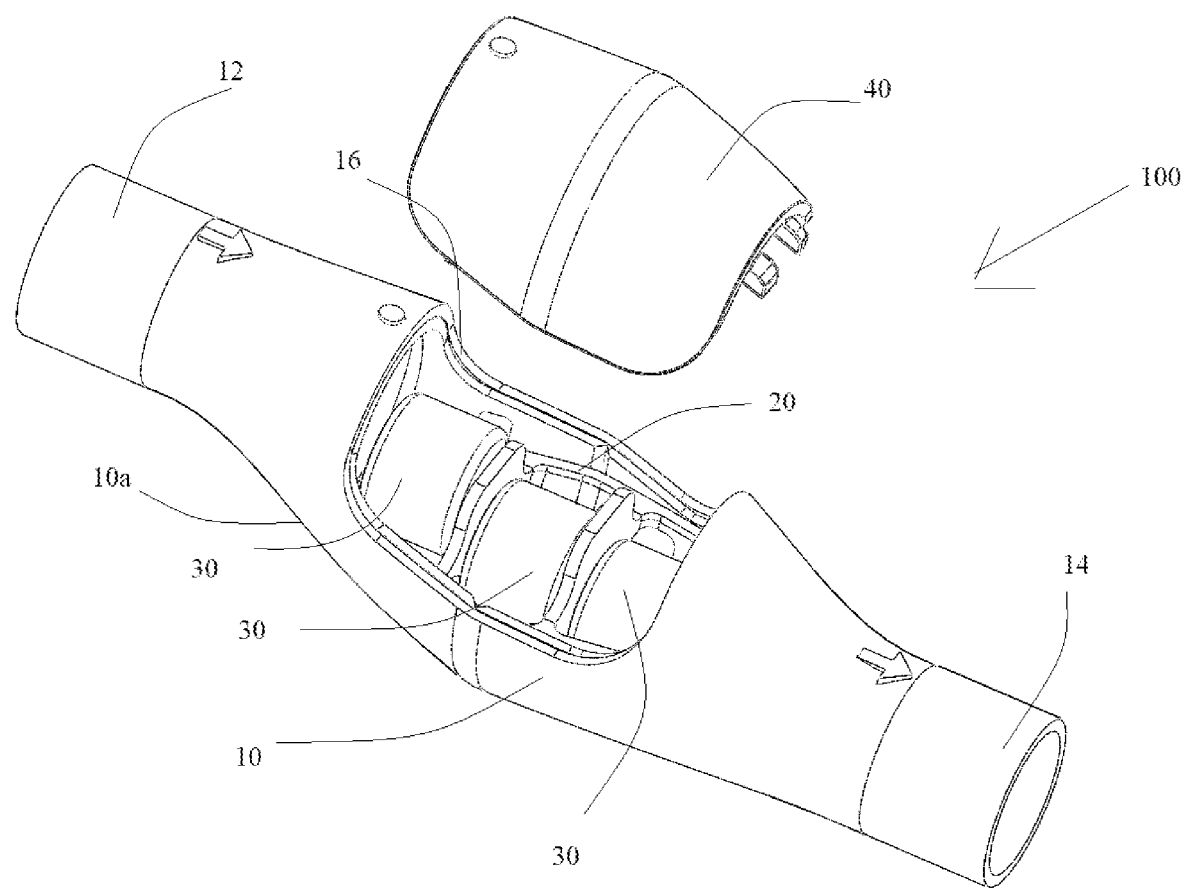
FIG. 1 is a perspective view of a passive air conditioner drain line chlorinator.
Figure 2:
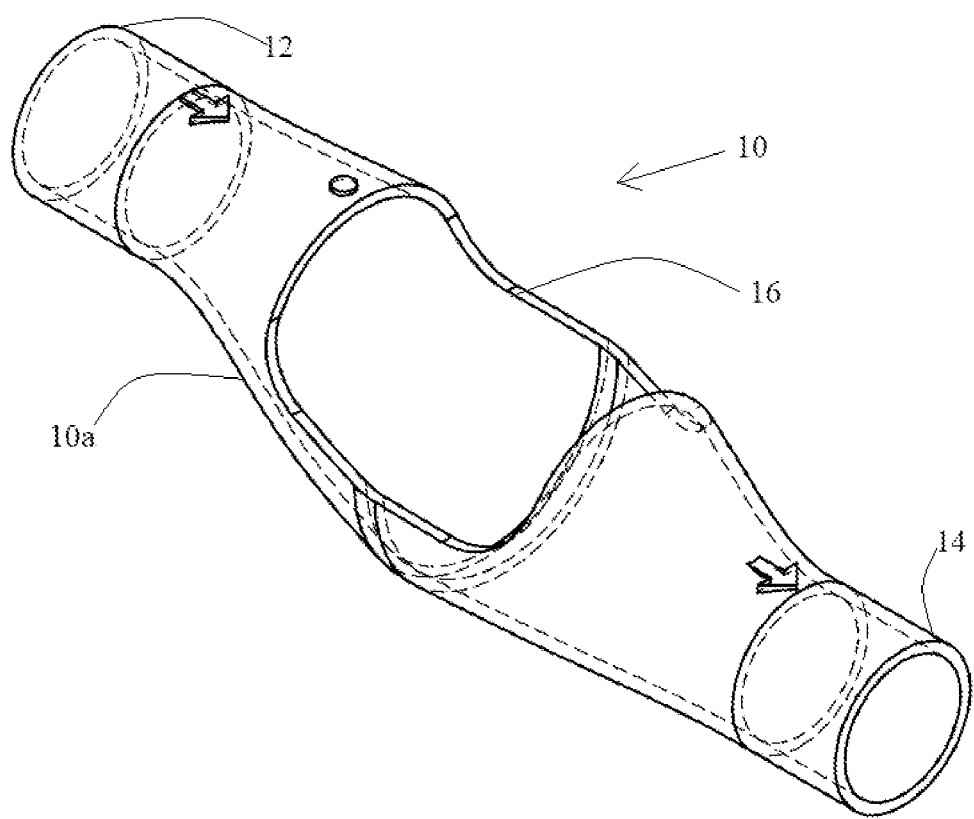
FIG. 2 is a perspective view of the sloped housing of the passive air conditioner drain line chlorinator.
Figure 3:
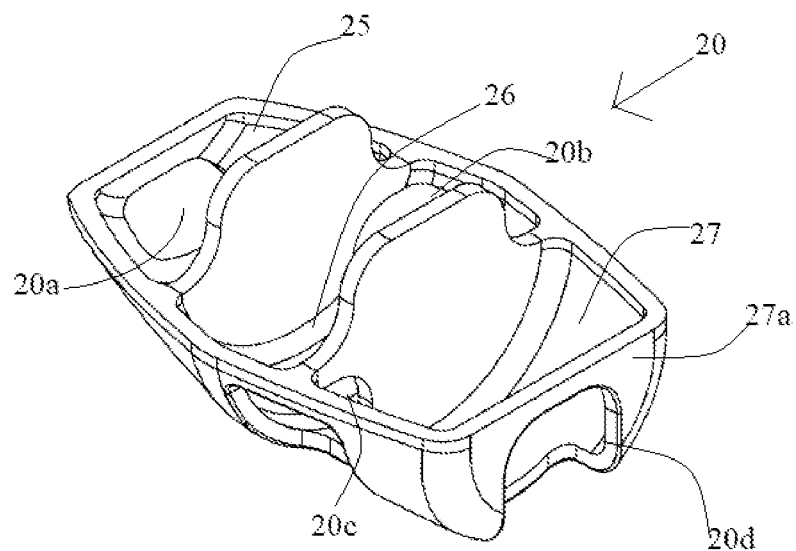
FIG. 3 is a perspective view of the clopped cartridge of the passive air conditioner drain line chlorinator.
Figure 4:
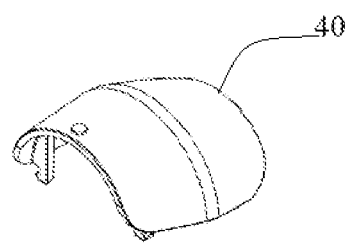
FIG. 4 is a perspective view of the cover of the passive air conditioner drain line chlorinator.
Figure 5:
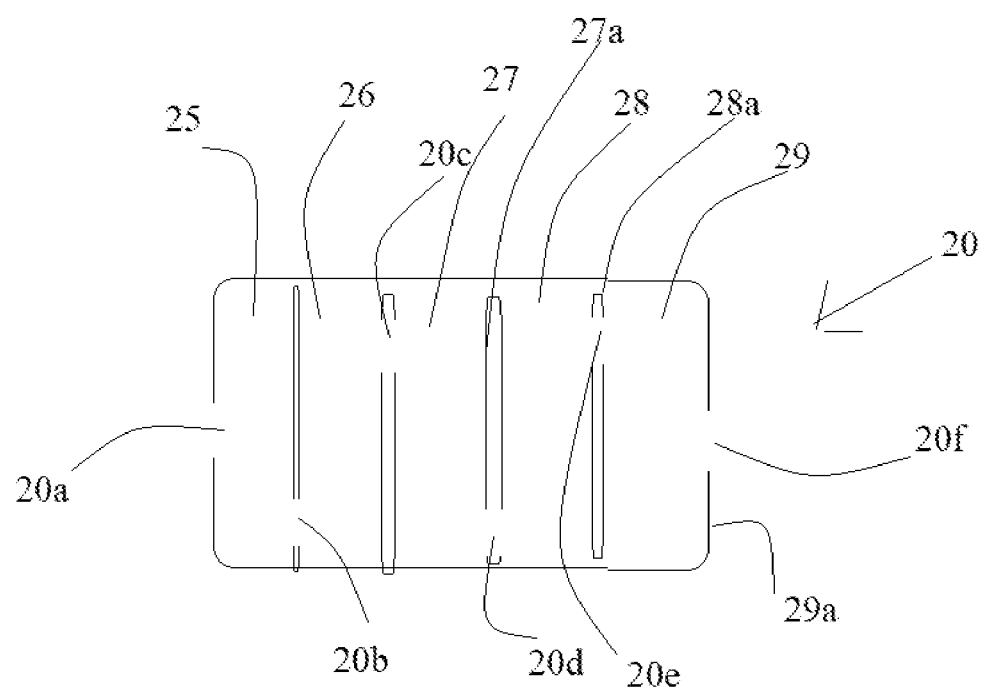
FIG. 5 is a top plan view of the sloped cartridge of the passive air conditioner drain line chlorinator.
Figure 6:
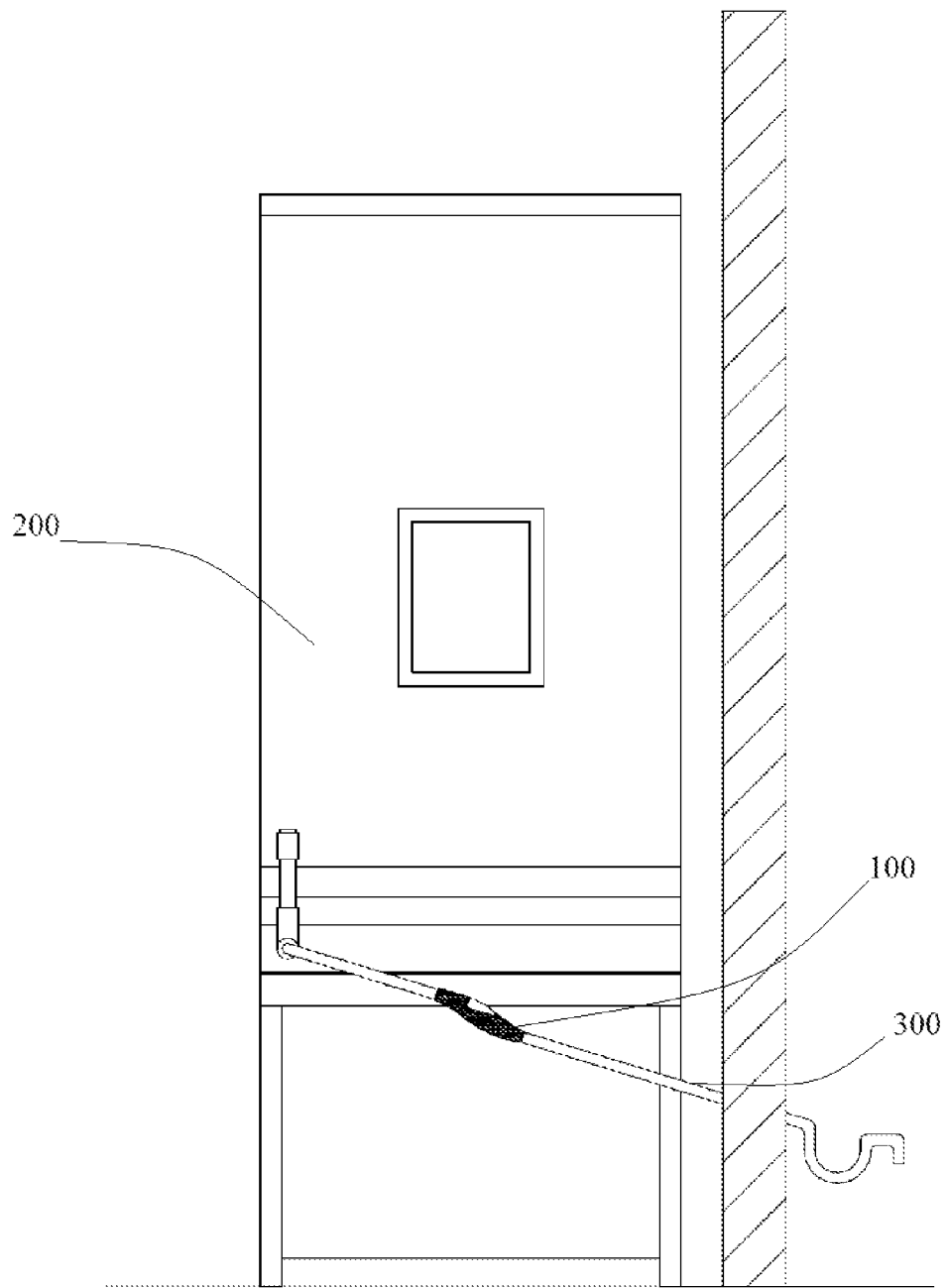
FIG. 6 is a side view of an air conditioner unit with the present invention installed.

Referring to FIGS. 1-6, the present invention is a passive air conditioner drain line chlorinator 100. The drain line chlorinator comprises 100 of a sloped housing 10 that defines an inlet drain line connector 12 and an outlet drain line connector 14. The sloped housing 10 slopes downward from the inlet drain line connector 12 to the outlet drain line connector 14. The sloped housing 10 defines a central aperture 16 that is at a position that is between the inlet drain line connector 12 and the outlet drain line connector 14 of the sloped housing 10. The inlet drain line connector 12 of the sloped housing 10 attaches to a drain line 100 that leaves the air conditioner 200, and the outlet drain line connector 14 of the sloped housing 10 attaches to a downward drain line 300 of the air conditioner 200. A sloped cartridge 20 that has an inlet 20a and an outlet 20b. The sloped cartridge 20 defines at least two compartments 25, 26, 27, 28 or 29; a first compartment 25 of the sloped cartridge 20 has an inlet central thru hole 20a that is the inlet of the sloped cartridge 20, a second compartment 26 is adjacent and downward from the first compartment 25, a first staggered thru hole 20b is defined between the first compartment 25 and the second compartment 26, and a second staggered thru hole 20c is defined on a downward wall of the second compartment 26 that is the outlet of the sloped cartridge 20. The sloped cartridge 20 is inserted within the central aperture 16 of the sloped housing 10 so that the sloped cartridge 20 is flush with a slope 10a of the sloped housing 10. At least two algae or mold eliminating tablets 30 are inserted within the compartments 25, 26, 27, 28, or 29 of the sloped cartridge 20. And, a cover 40 that pivotally connects to the sloped housing 10 so that the central aperture 16 of the sloped housing 10 is covered when the cover 40 is made to rest on the sloped housing 10. In a preferred embodiment, the cover 40 will be made of a transparent material.

In an embodiment of the present invention, the sloped cartridge defines a third compartment 27, the second staggered thru hole 20c is defined between the second 26 compartment and the third compartment 27, and a third staggered thru hole 20d is defined on a downward wall 27a of the third compartment 27 that is the outlet of the sloped cartridge 20.

In another embodiment of the present invention, the sloped cartridge 10 defines a fourth compartment 28, the third staggered thru hole 20d is defined between the third compartment 27 and the fourth compartment 28, and a fourth staggered thru hole 20e is defined on a downward wall 28a of the fourth compartment 28 that is the outlet of the sloped cartridge 20.

In still another embodiment of the present invention, the sloped cartridge 20 defines a fifth compartment 29, the fourth staggered thru hole 20e is defined between the fourth compartment 28 and the fifth compartment 29, and a fifth staggered thru hole 20f is defined on a downward wall 29a of the fifth compartment 29 that is the outlet of the sloped cartridge 20.

An advantage of the present invention is that it provides a device that extends the life of a tablet that is used to prevent algae or mold from growing in an air conditioner drain line.

Another advantage of the present invention is that it provides a device that allows a user to easily change the tablets needed to keep a drain line of an air conditioner unclogged.

A further advantage of the present invention is that it provides a device, that does not require a computerized system to maintain the drain line of an air conditioner free of algae or mold.

The embodiments of the passive air conditioner drain line chlorinator described herein are exemplary and numerous modifications, combinations, variations, and rearrangements can be readily envisioned to achieve an equivalent result, all of which are intended to be embraced within the scope of the appended claims. Further, nothing in the above-provided discussions of the passive air conditioner drain line chlorinator should be construed as limiting the invention to an embodiment or a combination of embodiments. The scope of the invention is defined by the drawings, the written description, and the appended claims.

What is claimed is:

1. A passive air conditioner drain line chlorinator that is connected to the outlet of a pan of an air conditioner and the drain line of the air conditioner, the drain line chlorinator comprises:
    a sloped housing that defines an inlet drain line connector and an outlet drain line connector, the sloped housing slopes downward from the inlet drain line connector to the outlet drain line connector, the sloped housing defines a central aperture that is at a position that is between the inlet drain line connector and the outlet drain line connector of the sloped housing, the inlet drain line connector of the sloped housing attaches to a drain line that leaves the air conditioner and the outlet drain line connector of the sloped housing attaches to a downward drain line of the air conditioner;
    a sloped cartridge that has an inlet and an outlet, the sloped cartridge defines at least two compartments, a first compartment of the sloped cartridge has an inlet central through-hole that is the inlet of the sloped cartridge, a second compartment is adjacent and downward from the first compartment, a first staggered through-hole is defined between the first compartment and the second compartment, a second staggered through-hole is defined on a downward wall of the second compartment and is an outlet of the sloped cartridge, the sloped cartridge is inserted within the central aperture of the sloped housing so that the sloped cartridge is flush with the slope of the sloped housing;
    at least two algae or mold eliminating tablets are inserted within the compartments of the sloped cartridge; and
    a cover that pivotally connects to the sloped housing so that the central aperture of the sloped housing is covered when the cover is made to rest on the sloped housing.

2. The passive air conditioner drain line chlorinator that is connected to the outlet of a pan of an air conditioner and the chain line of the air conditioner of claim 1, wherein the sloped cartridge defines a third compartment, the second staggered through-hole is further defined between the second compartment and the third compartment, and a third staggered through-hole is defined on a downward wall of the third compartment and is an outlet of the sloped cartridge.

3. The passive air conditioner drain line chlorinator that is connected to the outlet of a pan of an air conditioner and the drain line of the air conditioner of claim 2, wherein the sloped cartridge defines a fourth compartment, the third staggered through-hole is further defined between the third compartment and the fourth compartment, and a fourth staggered through-hole is defined on a downward wall of the fourth compartment and is an outlet of the sloped cartridge.

4. The passive air conditioner drain line chlorinator that is connected to the outlet of a pan of an air conditioner and the drain line of the air conditioner of claim 3, wherein the sloped cartridge defines a fifth compartment, the fourth staggered through-hole is further defined between the fourth compartment and the fifth compartment, and a fifth staggered through-hole is defined on a downward wall of the fifth compartment and is an outlet of the sloped cartridge.

* * * * *